US005702043A

United States Patent [19]

Logtens et al.

[11] Patent Number: 5,702,043

[45] Date of Patent: Dec. 30, 1997

[54] AUXILIARY TRANSPORT DEVICE

[75] Inventors: Gerardus M. C. J. Logtens, Holthees; Franciscus G. M. Scheepens, Gemert, both of Netherlands

[73] Assignee: Stork Contiweb B.V., Netherlands

[21] Appl. No.: 676,040

[22] Filed: Jul. 5, 1996

[30] Foreign Application Priority Data

Jul. 6, 1995 [NL] Netherlands .......................... 1000740

[51] Int. Cl.$^6$ .......................... G03B 1/56

[52] U.S. Cl. .......................... 226/92

[58] Field of Search .......................... 226/92, 91, 170, 226/172

[56] References Cited

U.S. PATENT DOCUMENTS

| | | | |
|---|---|---|---|
| 3,995,553 | 12/1976 | Winterholler | 101/228 |
| 4,138,074 | 2/1979 | Ross et al. | 226/92 X |
| 4,598,850 | 7/1986 | Winterholler | 226/92 |
| 5,094,394 | 3/1992 | Saukkonen | 226/92 X |
| 5,263,414 | 11/1993 | Lehrrieder et al. | 226/92 X |
| 5,397,044 | 3/1995 | Suzuki | 226/92 |
| 5,400,940 | 3/1995 | Sato et al. | 226/92 |

FOREIGN PATENT DOCUMENTS

| | | |
|---|---|---|
| 0152737 | 8/1985 | European Pat. Off. . |
| 2357443 | 2/1978 | France . |
| 2402768 | 10/1974 | Germany . |
| 1585368 | 3/1981 | United Kingdom . |

*Primary Examiner*—Michael Mansen
*Attorney, Agent, or Firm*—Michael D. Bednarek; Kilpatrick Stockton LLP

[57] ABSTRACT

An auxiliary transport device for transporting a chain part of a web conveying mechanism, which mechanism guides the start of a web of material through a processing device, comprises a transport device, having a length of at least the transit path of the web of material, for engaging and moving the chain part of the web conveying mechanism, as well as a drive device arranged outside the device for moving the transport device and guide, which are arranged along the transit path of the web of material, for guiding the transport device and the chain part through the device.

16 Claims, 2 Drawing Sheets

AUXILIARY TRANSPORT DEVICE

TECHNICAL FIELD

The invention relates to an auxiliary transport device for transporting a chain part of a web conveying mechanism, which mechanism guides the start of a web of material through a device for processing the web of material.

PRIOR ART

Web conveying mechanisms for feeding the start of a web of material into a processing device are generally known and usually comprise web conveying means, such as chains, which can be moved at least along one side of the transit path of the web of material through the processing device, fastening means for holding the start of the web of material, guide means for guiding the web conveying means, as well as drive means, such as driven toothed wheels, for transporting the web conveying means through the guide means. Web conveying devices of this kind are used, for example, in the various devices on printing lines for printing paper and/or textiles, including a roll exchanger and the cutting and folding apparatus. In these known web conveying mechanisms, a finite chain part is often used as the web conveying means, which chain part is moved over a plurality of drive members which are arranged at a regular distance from one another. The chain part has a length of at least the distance between these drive members, as a result of which the chain part is thus always moved forward and advanced to the following drive point by at least one drive member.

If a mechanism of this kind is used in devices of great length, in which the web of material is subjected to a treatment at high temperature, such as in driers, the drive members arranged in the device are also exposed to such high temperatures and temperature differences. In order that such drive members should function correctly, measures such as the incorporation of thermal resistances and thermal bridges are required. Measures of this kind, however, increase the cost of the device and in practice appear to give unsatisfactory results.

If, in the case of high-temperature treatment devices of this kind, the drive members were to be arranged outside the device and a correspondingly longer length of chain were to be used, there is a danger of the length of chain jamming or of their being an irregular feed of the web of material, with the corresponding risks of the web being damaged or breaking.

A web conveying mechanism with an endless chain, the chain of which runs from the start of the transit path and then runs along a different route inside or outside the device in the opposite direction—in a mechanism of this kind, the drive members can be arranged outside the device—, has the disadvantage that this mechanism has to be operated separately and cannot be integrated with the other devices to form a system. In order to feed the start of the web of material into a processing device which follows the treatment device at high temperature, this start first has to be uncoupled from the web conveying mechanism with an endless chain and has to be reconnected to a web conveying mechanism which operates in the following processing device. This is a very labour-intensive action and impedes the progress and the speed of the operation considerably.

SUMMARY OF THE INVENTION

The object of the present invention is to provide an auxiliary transport device by means of which the above-described disadvantages are avoided.

More particularly, the object of the present invention is to provide an auxiliary transport mechanism for transporting a chain part of a web conveying mechanism, the drive stations for the chain part which are usually arranged in the high-temperature treatment device being superfluous, while the coupling to the web conveying mechanisms of processing devices which are situated upstream and downstream of the high-temperature treatment device is maintained.

The auxiliary transport device according to the invention is characterized in that it comprises transport means, having a length of at least the transit path of the web of material, for engaging and moving the chain part of the web conveying mechanism, as well as drive means for moving the transport means and guide means, which are arranged along the transit path of the web of material, for guiding the transport means and the chain part through the device.

According to the invention, the driving of the chain part of a conventional web conveying mechanism, to which the start of the web of material is fastened before this chain part enters the treatment device, is taken over by the transport means, and after the start of the material has passed through the device, the drive of the chain part of the web conveying mechanism is taken over once more by its own drive. Since the transport means of the auxiliary transport device according to the invention have a length of at least the transit path of the web of material through the device, the conventional drive stations in the device are superfluous, and a drive means outside the high temperature device are sufficient. The transport means can have a finite length, but can also have a closed, i.e. endless, form. In the context of this specification and the attached claims, the term "outside the device" should be understood as meaning the region which is not exposed to high temperatures, that is to say outside the housing of the device itself or, in the case of a double-walled structure, between the walls thereof. In the case of an assembly of a drier and a cooling device which is connected directly thereto, the drive can, of course, be arranged in the cooling device, because the problem which has been set does not occur in the cooling device. The guide means will, of course, have a shape which is such that it is simple to couple and uncouple the transport means according to the invention to and from the chain part upstream and downstream of the device. The auxiliary transport system according to the invention can be integrated into existing devices with a web conveying device based on a chain part in a simple manner, so that the start of a web of material can be taken through the whole device in one go, for example from the roll exchanger to the folding and cutting apparatus.

BRIEF DESCRIPTION OF THE DRAWINGS

The invention will be explained below with reference to the drawing, in which.

PREFERRED EMBODIMENTS OF THE INVENTION

Figure 1:
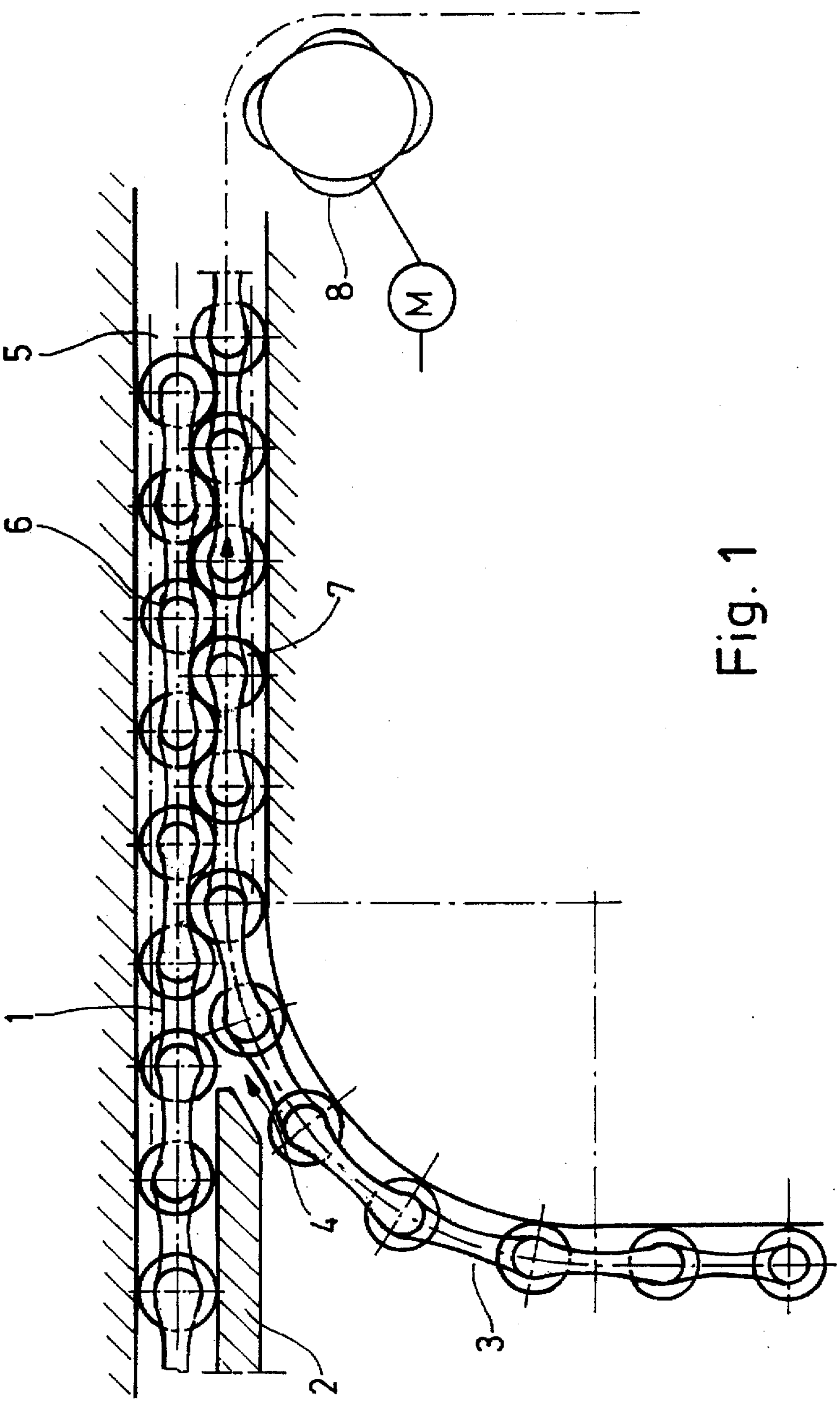
FIG. 1 is a view of a first embodiment of an auxiliary transport device according to the invention for use in a device with a conventional web conveying mechanism.

According to a first embodiment, the transport means comprise a chain, the links of which, during use, engage between the links of the chain part of the web conveying mechanism. In general, in the case of two chains of the same type which engage in one another in a staggered manner situated one above the other, their wheels will turn in such a manner (i.e. in opposite directions) that the chains are easily transported in the guide means, since no friction, or scarcely any friction, occurs. The guide means preferably comprise a guide rail. For the purpose of joining the two chains to one another at the start of the transit path, a "switch" can be used. A switch of this kind can likewise be used for pulling the chains apart from one another at the other end of the transit path of the web of material.

The chain of the auxiliary transport device according to the invention may or may not be closed, that is to say may either be a chain with a finite length or an endless chain. The chain of the auxiliary transport device according to the invention can be used both as a push chain and as a pull chain. The drive means which are conventionally used for chains, such as toothed wheels and the like, can be used in this embodiment.

According to a second embodiment of the auxiliary transport device according to the invention, the transport means comprise a material profile which is provided with engagement elements for engaging with the chain part of the web conveying mechanism. The material profile of the required length, which, for example, has a square or rectangular cross-section, although other shapes, such as round and triangular, also number amongst the possibilities, is preferably produced from spring band steel. This material possesses all the required and desired properties, even if relatively thin spring band steel, for example having a thickness of 0.2 mm, is used, and can easily be reduced or shortened to the desired length. In particular, this material is resistant to the temperatures of approx. 300° C. prevailing in a drier, is sufficiently flexible and can easily be wound up, for example on a reel which is driven by a motor. In addition, a profile of this kind can be driven, for example, by means of a friction drive. The guide means will, of course, be adapted to the profile of the transport means, as will be understood by a person skilled in the art.

According to a further embodiment, the engagement elements, which are present on the material profile, advantageously form a short length of chain, which is fastened to the profile at one end. The chains will engage into one another in the manner which has already been described above. According to another embodiment, the engagement elements form cams, which engage in the chain part of the existing web conveying mechanism.

A further possibility for the transport means of the auxiliary transport device according to the invention is a link conveyor.

In addition, the invention relates to a device, in particular a drier, which is provided with a chain part comprising a web conveying mechanism, which device is also provided with an auxiliary transport device according to the invention.

In FIG. 1, an embodiment of an auxiliary transport device according to the invention for use with an existing web conveying mechanism comprising a chain part is shown for the case of a drier. The existing web conveying mechanism comprises a chain part 1, which is guided in guide rail 2. Conventional fastening means (not shown) are fastened to the chain part i for the purpose of holding the start of the web of material. An endless chain 3 of an auxiliary transport device according to the invention is guided over a toothed wheel 8 driven by a motor (M) arranged outside the drier, which toothed wheel is driven in a conventional manner. At a position upstream of the start of the transit path of the web of material, the chain part 1 and the chain 3 come together via an opening 4 (switch) in the guide rail 2. The chain 3 and chain part 1 are guided through the drier in a "positively-locking manner" in guide rail 5, the wheels 6 and 7, respectively, of the chains 1 and 3 rotating in the direction indicated with arrows. At the end of the transit path through the drier, the endless chain 3 and the chain part 1 are uncoupled again, and the chain part can be moved, by means of further drive stations, to the further components of the device, for example a cooling device. At the start and end of the transit path of the web of material, a signalling device may be present, which detects the presence of the chain part 1 and activates the drive means of the auxiliary transport device according to the invention.

Figure 2:
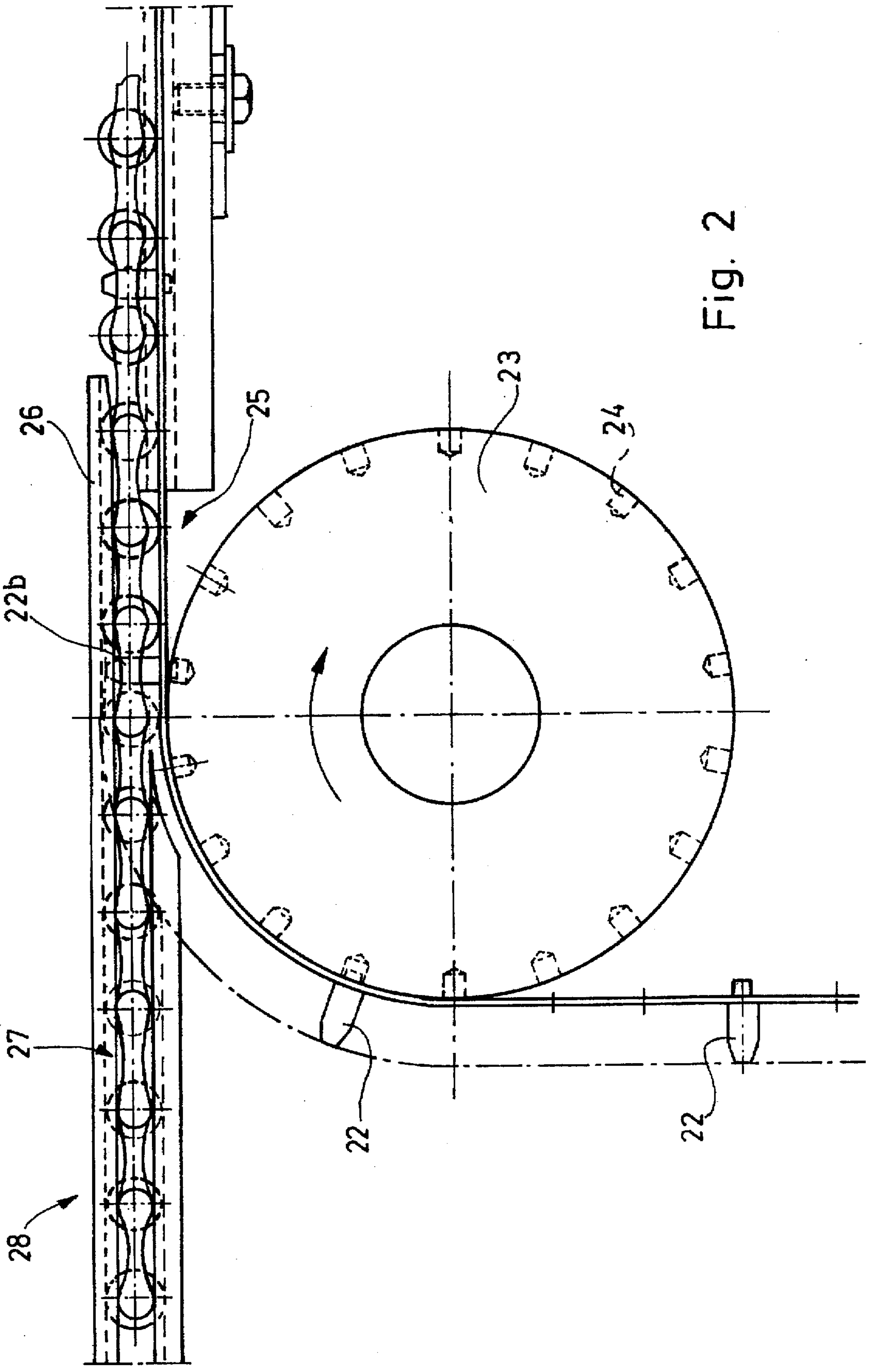
FIG. 2 is a view of a second embodiment of an auxiliary transport device according to the invention for use in a device with a conventional web conveying mechanism.

In FIG. 2, another embodiment of the auxiliary transport device according to the invention is depicted. Instead of an endless chain, a band profile of spring band steel 21 is used as the transport means. The band is provided with a number of cams 22 which extend on both sides of the band 21. A drive member 23 is provided on the circumference with recesses 24, into which cam part **22*a* falls, in order to transport the band 21. Via an opening 25 (switch), the band 21 is introduced into guide rail 26. On moving the band 21, cam part 22*b* falls between the links 27 of chain part 28, and this cam part 22*b* thus functions as an engagement point for chain part 28. At the end of the drier into which the web of material is to be introduced, the chain part 28** can be uncoupled from the band in a similar manner and transferred, for example, to its own drive station.

The auxiliary transport devices according to the invention depicted in FIGS. 1 and 2 can in particular be used in processing devices which are already provided with their own web conveying mechanism with a chain, in the case of which a drive in the processing devices themselves is undesirable, such as in driers.

A profile made of spring band steel can also advantageously be used as the transport means instead of a chain in existing web conveying devices.

What is claimed is:

1. Auxiliary transport device for transporting a chain part of a web conveying mechanism, which mechanism guides a starting end of a web of material along a transit path that has a start and an end through a device for processing the web of material, wherein the auxiliary transport device comprises transport means, having a length of at least the transit path of the web of material, for engaging and moving the chain part of the web conveying mechanism, as well as drive means for moving the transport means and guide means, which are arranged along the transit path of the web of material, for guiding the transport means and the chain part through the device.

2. Auxiliary transport device according to claim 1, wherein the transport means comprise a chain having a plurality of links wherein the links of the chain engage between the links of the chain part of the web conveying mechanism.

3. Auxiliary transport device according to claim 1, wherein the guide means comprise a guide rail.

4. Auxiliary transport device according to claim 1, wherein the transport means comprise a material profile which is provided with engagement elements for engaging with the chain part of the web conveying mechanism.

5. Auxiliary transport device according to claim 4, wherein the engagement elements comprise a length of chain having a plurality of links and wherein the links of the length of chain interact with the links of the chain part during transportation through the device.

6. Auxiliary transport device according to claim 4, wherein the engagement elements comprise at least one cam which engages in the links of the chain part.

7. Auxiliary transport device according to claim 4, wherein the material profile is produced from spring band steel.

8. Auxiliary transport device according to claim 1, wherein the drive means comprise a toothed wheel which is arranged at the start of the transit path of the web of material or at the end of the transit path of the web of material, respectively.

9. Device for processing a web of material provided with a web conveying mechanism for guiding a starting end of a web of material along a transit path that has a start and an end through the device, comprising a chain part, wherein the device further comprises an auxiliary transport device for transporting the chain part of the web conveying mechanism, wherein the auxiliary transport device comprises transport means, having a length of at least the transit path of the web of material, for engaging and moving the chain part of the web conveying mechanism, as well as drive means for moving the transport means and guide means, which are arranged along the transit path of the web of material, for guiding the transport means and the chain part through the device.

10. Device according to claim 9, wherein the transport means comprise a chain having a plurality of links and wherein the links of the chain engage between the links of the chain part of the web conveying mechanism.

11. Device according to claim 9, wherein the guide means comprise a guide rail.

12. Device according to claim 9, wherein the transport means comprise a material profile which is provided with engagement elements for engaging with the chain part of the web conveying mechanism.

13. Device according to claim 12, wherein the engagement elements comprise a length of chain having a plurality of links and wherein the links of the length of chain interact with the links of the chain part during transportation through the device.

14. Device according to claim 12, wherein the engagement elements comprise at least one cam which engages in the links of the chain part.

15. Device according to claim 12, wherein the material profile is produced from spring band steel.

16. Device according to claim 9, wherein the drive means comprise a toothed wheel which is arranged at the start of the transit path of the web of material or at the end of the transit path of the web of material, respectively.

* * * * *